US006980608B2

(12) United States Patent
Yamauchi

(10) Patent No.: US 6,980,608 B2
(45) Date of Patent: Dec. 27, 2005

(54) DIGITAL SIGNAL DETECTOR, DIGITAL DEMODULATOR, METHOD FOR DETECTING DIGITAL SIGNAL, AND METHOD FOR SYNCHRONOUS DETECTING BY DIGITAL DEMODULATOR

(75) Inventor: Ken Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 09/793,876

(22) Filed: Feb. 28, 2001

(65) Prior Publication Data

US 2001/0043657 A1 Nov. 22, 2001

(30) Foreign Application Priority Data

May 11, 2000 (JP) ............................ 2000-138116

(51) Int. Cl.[7] .......................... H04D 1/00; H04L 27/06
(52) U.S. Cl. ...................... 375/342; 375/340; 375/316
(58) Field of Search ............................... 375/342, 354, 375/355, 368, 343; 370/206; 329/304

(56) References Cited

U.S. PATENT DOCUMENTS 5,579,346 A 11/1996 Kanzaki ..................... 375/344
6,108,525 A 8/2000 Takemura .................. 455/67.4
6,625,239 B1 * 9/2003 Shiraishi et al. ............ 375/354
6,717,993 B1 * 4/2004 Shiraishi et al. ............ 375/329

FOREIGN PATENT DOCUMENTS

JP 11-55149 2/1999

OTHER PUBLICATIONS

European Search Report dated Jul. 9, 2004 for EP 01301776.

* cited by examiner

*Primary Examiner*—Stephen Chin
*Assistant Examiner*—Erin M. File
(74) *Attorney, Agent, or Firm*—Arent Fox PLLC

(57) ABSTRACT

A digital signal detector converts quantized modulation signals to digital data according to a plurality of discriminating conditions which are set by shifting phases, which are to be boundaries of discrimination, from each other. Predetermined data in the digital data are combined so that the phases used for discriminating the data rotate in time series, thereby constituting a plurality of comparison data. When a plurality of comparison data strings coincides with expected data strings, predetermined data strings can be detected. Since a plurality of comparison data strings corresponding to a plurality of frequency differences are compared with expected data strings by a plurality of discriminating units, data strings with frequency differences can be simultaneously detected, which results in shortening the time required for detection.

8 Claims, 15 Drawing Sheets

| synchronizing character detector | | | | | | | |
|---|---|---|---|---|---|---|---|
| input terminal | 6-1 | input terminal | 6-2 | input terminal | 6-3 | input terminal | 6-4 |
| 0 | 4a(0) | 0 | / 4d(0) | 0 | / 4c(0) | 0 | / 4b(0) |
| 1 | / 4d(1) | 1 | / 4c(1) | 1 | / 4b(1) | 1 | / 4a(1) |
| 2 | / 4c(2) | 2 | / 4b(2) | 2 | / 4a(5) | 2 | 4d(2) |
| 3 | / 4b(3) | 3 | / 4a(3) | 3 | 4d(6) | 3 | 4c(3) |
| 4 | / 4a(4) | 4 | 4d(4) | 4 | 4c(4) | 4 | 4b(4) |
| 5 | 4d(5) | 5 | 4c(5) | 5 | 4b(5) | 5 | 4a(5) |
| 6 | 4c(6) | 6 | 4b(6) | 6 | 4a(6) | 6 | / 4d(6) |
| 7 | 4b(7) | 7 | 4a(7) | 7 | / 4d(7) | 7 | / 4c(7) |

Fig. 11

| synchronizing character detector | | | | | | | |
|---|---|---|---|---|---|---|---|
| input terminal | 6-5 | input terminal | 6-6 | input terminal | 6-7 | input terminal | 6-8 |
| 0 | 4a(0) | 0 | 4b(0) | 0 | 4c(0) | 0 | 4d(0) |
| 1 | 4b(1) | 1 | 4c(1) | 1 | 4d(1) | 1 | / 4a(1) |
| 2 | 4c(2) | 2 | 4d(2) | 2 | / 4a(2) | 2 | / 4b(2) |
| 3 | 4d(3) | 3 | / 4a(3) | 3 | / 4b(3) | 3 | / 4c(3) |
| 4 | / 4a(4) | 4 | / 4b(4) | 4 | / 4c(4) | 4 | / 4d(4) |
| 5 | / 4b(5) | 5 | / 4c(5) | 5 | / 4d(5) | 5 | 4a(5) |
| 6 | / 4c(6) | 6 | / 4d(6) | 6 | 4a(6) | 6 | 4b(6) |
| 7 | / 4d(7) | 7 | 4a(7) | 7 | 4b(7) | 7 | 4c(7) |

Fig. 12

DIGITAL SIGNAL DETECTOR, DIGITAL DEMODULATOR, METHOD FOR DETECTING DIGITAL SIGNAL, AND METHOD FOR SYNCHRONOUS DETECTING BY DIGITAL DEMODULATOR

BACKGROUND OF THE INVENTION

1. Field of the Invention

The present invention relates to a digital signal detector that detects a predetermined data string among modulated digital signals and a method for detecting a digital signal. Moreover, the present invention relates to a digital demodulator for demodulating modulated digital signals and a method for synchronous detection by the digital demodulator.

2. Description of the Related Art

Recently, broadcasting systems such as television, etc., has been being shifting from an analog system to a digital system. The ISDB-S (Integrated Services Digital Broadcasting) that is one of the satellite digital broadcasting systems in Japan is a standard for transmitting signals by combinations of a plurality of modulation techniques. It is indispensable that a demodulator of the ISDB-S synchronously detects signals even where the noise field intensity is very high and maintains its synchronized state. In order to enable synchronous detection and to be able to maintain its synchronized state under these bad conditions in the ISDB-S, information necessary to demodulate transmission signals (a signal provided for the purpose of synchronous detection and maintaining its synchronized state) is arrayed in transmission signals in accordance with a predetermined rule. And, it is necessary to detect the information in order to demodulate the transmission signals.

FIG. 1 shows the outline of transmission signals in the ISDB-S.

The largest unit of a transmission signal is called a "super frame", and one super frame consists of eight frames. One frame is composed of a synchronizing character 1, a TMCC (Time Multiplexing Configuration Control) signal, a synchronizing character 2 (or a synchronizing character 3), a main signal, a burst signal, a main signal, etc. The synchronizing characters 1, 2 and 3 are specified bit strings necessary to establish synchronization, wherein each of the bit strings is composed of 32 symbols. The TMCC signal is a signal that shows information of a transmission system and a transmitting station, etc., in one super frame, which consists of 1024 symbols (128 symbols×8 frames). The main signal is a signal that is obtained by modulating data of pictures and sound, etc., which are transmitted by a broadcasting station. The burst signal is a signal to be inserted to enable synchronization where the noise field intensity is low, and to maintain the state after the synchronization is established.

The synchronizing characters 1, 2 and 3, the TMMC signal, and the burst signal are modulated by the BPSK (Binary Phase Shift Keying). To the contrary, the main signal may be transmitted by a combination of optional modulation techniques. That is, the main signal is modulated by the BPSK, QPSK (Quadrature PSK), or 8PSK. The TMCC signal has information showing which types of modulation techniques are combined to transmit signals. Therefore, the main signal may be demodulated for the first time by acquiring the TMCC signal. That is, detection of the synchronizing characters and demodulation of the TMCC signal are required to commence the demodulation.

Thus, detection of the synchronizing characters is very important to demodulate transmitted signals. A detector that detects the synchronizing characters is required to detect synchronizing characters in poor conditions as described above.

FIG. 2 shows various phase vectors (signal point maps) of synchronizing characters modulated by the BPSK. In the drawing, the axis I indicates a carrier phase that has the same phase as that of the reference phase, and axis Q indicates a carrier phase orthogonal to the axis I. For example, information of signals modulated by BPSK is as shown in FIG. 2(*a*). That is, a binary state (0 or 1) is discriminated by using the axis Q as a boundary axis. Therefore, even in a case where the frequency of a carrier wave more or less shifts from the frequency of an oscillator, (for example, a carrier regenerating circuit) in a demodulator (a frequency difference), it is possible to detect synchronizing characters by the discriminator having a discriminating condition of FIG. 2(*a*). Herein, in the BPSK, a range fd[Hz] of the above-mentioned frequency shift where the synchronizing characters can be detected is $fd<F/2N$, when the length of the synchronizing characters is N[bit], and the modulating speed is F[baud].

However, where synchronizing characters are detected by only a discriminator having the discriminating conditions described in FIG. 2(*a*), the range fd of the frequency shift becomes smaller when a noise occurs in a transmission line. In a case where a synchronous character is on the axis Q (on the boundary between two digits) without a noise in a transmission line and with the range fd of the frequency shift being small, synchronous character can not be detected. Therefore, the conventional synchronizing character detector is provided with a discriminator having the discriminating conditions described in FIG. 2(*a*) and at the same time discriminators having discriminating conditions (FIGS. 2(*b*), (*c*) and (*d*)) which are set by shifting phases, which are to be the boundaries of discrimination, from each other. By concurrently operating four discriminators with different discriminating conditions from each other, it is possible to detect synchronizing characters regardless of phases of carrier waves and the occurrence of noise.

FIG. 3 shows a synchronizing character detector having four discriminators 2.

The discriminators 2 respectively have the characteristics shown in FIGS. 2(*a*), (*b*), (*c*) and (*d*), wherein an input signal (synchronizing character modulated by the BPSK) is binarily detected. Also, in fact, the four discriminators 2 can operate equivalent to the case of eight discriminators 2 upon receiving an input signal or an inverted input signal. Results of the discrimination made by the discriminators 2 are stored in a buffer 4 that stores information equivalent to the synchronizing character length (in this example, eight symbols). The synchronizing character discriminator 6 compares a comparison data string (input signal) stored in the buffer 4 with an expected data string (synchronizing character), and it detects a synchronizing character included in the input signal. The result of the detection of synchronizing characters, which have been made by the synchronizing character discriminator 6, is outputted as an signal of the synchronizing character via an OR circuit 8. That is, since any one of the synchronizing character discriminators 6 detects a synchronizing character, the synchronizing character detection signal is activated. And, the TMCC signal is demodulated after the synchronizing character is detected, and the transmission signal is demodulated.

FIG. 4 shows an example of a prior art synchronizing character detection.

In the example, the oscillation frequencies of a demodulator are sequentially shifted by a frequency sweeper, and the frequency shift of the carrier waves that can be demodulated by the demodulator is set larger than the range fd of the frequency differences. Figures in brackets in the drawing indicate the order of sweeping. The frequency can be swept nine times, and the synchronizing characters can be demodulated in a range of ±9 fd.

FIG. 5 shows a flow chart of the detection of a synchronizing character in a demodulator having a frequency sweeper.

First, the demodulator converts the frequency of a reference signal in a carrier regenerating circuit to a frequency corresponding to, for example, FIG. 4(1), and repeatedly detects synchronizing characters while a timer is operating. The cycle of the timer is set so that synchronizing characters are detected several times to several tens of times. By detecting the synchronizing characters a plurality of times, the synchronizing characters can be securely detected even in a case where noise occurs. Where the synchronizing characters are detected, the operation flow shown in FIG. 5 is terminated, wherein the TMCC signal and main signals are demodulated.

Where no synchronizing character is detected during the operation of the timer, the operation frequency of the carrier regenerating circuit is shifted to the next area (for example, FIG. 4(2)) by the frequency sweeper. And a synchronizing character is repeatedly detected. Where no synchronizing character can be detected, the frequency sweeping and detection of synchronizing characters are repeated in the ranges shown in FIG. 4. As a result, even in a case where a frequency shift of the carrier wave from the carrier regenerating circuit is large, it is possible to detect synchronizing characters.

However, where the noise field intensity is large, the time required to detect a synchronizing character is increased due to a decrease in the detection probability of a synchronizing character. In addition, when the noise field intensity is large, the range fd of a detectable frequency shift is decreased since a signal does not exist at a position in a phase space where the signal is to originally exist. Therefore, in order to securely detect a synchronizing character when the noise field intensity is large, it is necessary to reduce the range fd of the frequency shift and lengthen the time required for detection of a synchronizing character (the number of times detection is performed) in a range fd. In other words, even though an optimal time necessary for detecting a synchronizing character and the sweeping frequency are determined by measuring the noise field intensity, the time for detecting a synchronizing character of a signal having a specific frequency difference will be lengthened as the noise field intensity increases. Therefore, the length of time needed for detecting a synchronizing character has importance when the noise field intensity is high although it does not when it is low.

In order to solve such a problem, a plurality of carrier regenerating circuits are formed in the demodulator, and these carrier regenerating circuits are operated in parallel, synchronizing characters with a plurality of frequency differences may be simultaneously detected. However, the carrier regenerating circuit is composed of a phase rotator, a synchronizing character detector, a loop filter, a timing generator, a ROM, etc., wherein the circuit scale is large among the components of a demodulator. Accordingly, it is difficult to achieve such a carrier regenerating circuit in terms of cost and power consumption.

Further, a demodulator, in which a rotation angle of a phase of a signal that is received is calculated based on a difference between the phase of the past signal point and the phase of the present signal point, and which operates on the basis of the rotation angle, is disclosed in Japanese Patent Gazette No. 2538888. However, in case that the noise field intensity is large in the demodulator, the calculated phase rotation angle (predicted value) does not coincide with the actual rotation angle. Therefore, the signal detection performance is drastically lowered when the noise field intensity is very high. Accordingly, it is difficult for such a type of a demodulator to be employed as a demodulator of the ISDB-S.

SUMMARY OF THE INVENTION

It is an object of the present invention to detect a predetermined data string from modulated digital signals even where noise field intensity is very high.

According to one of the aspects of a digital signal detector and a method for detecting a digital signal in the present invention, a detector has a plurality of conversion units, a data composing unit and a plurality of discriminating units. The conversion units receive quantized modulation signals and convert the received signals to a plurality of digital data each having a predetermined length according to a plurality of discriminating conditions which are set by shifting phases, which are to be boundaries of discrimination, from each other. The data composing unit constitutes a plurality of comparison data strings by combining predetermined data existing in a plurality of converted digital data so that the phases used for discriminating the predetermined data rotate. For example, the phases rotate in time series. The discriminating units compare a plurality of comparison data strings with an expected data string, respectively. A predetermined data string is detected when a comparison data string in any one of the discriminating units coincides with the expected data string.

Generally, in a case where there has a frequency difference between a reference signal used for detecting a digital signal and a carrier wave, it is difficult to detect the predetermined data string. However, when the frequency difference corresponds to a transitional angle of the phase used for discriminating each data in a certain comparison data string, it becomes possible to detect the predetermined data string. A plurality of comparison data strings corresponding to a plurality of differences in frequency are constituted, and the comparison data strings are respectively compared with the expected data string in a plurality of discriminating units so that it is possible to simultaneously detect predetermined data strings with frequency differences from each other. This results in shortening the time required for detection.

The data composing unit constitutes a plurality of comparison data strings by combining data of the digital data converted by a plurality of conversion units. In other words, since a plurality of conversion units is commonly used to generate a plurality of comparison data strings, an increase in circuit scale is inconsiderable in comparison with the prior art. Utilizing the prior art conversion units can improve design efficiency.

According to another aspect of a digital signal detector in the present invention, a detector has a frequency difference detector. Therefore, when a comparison data string in any one of the discriminating units coincides with an expected data string, it is possible to detect a frequency difference between a modulation signal and a reference signal.

According to another aspect of a digital modulator and a synchronous detection method for a digital demodulator in the present invention, a demodulator has the above-mentioned digital signal detector. Accordingly, the time required for detection of a predetermined data string and for synchronous detection can be shortened. Since it is possible to simultaneously detect predetermined data strings with frequency differences from each other, the number of times sweeping is performed can be lowered in a digital demodulator where frequencies are swept.

According to another aspect of a digital demodulator in the present invention, the demodulator has a frequency difference detector. Therefore, a frequency difference between the modulation signal and the reference signal can be detected and the detection result can be fed back to a control system, whereby the time required for synchronous detection can be further shortened.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 11 is an explanatory view showing the outline of actions of the synchronizing unit 40 of FIG. 8;

FIG. 12 is an explanatory view showing the outline of actions of the synchronizing unit 42 of FIG. 9;

DESCRIPTION OF THE PREFERRED EMBODIMENTS

Hereinafter, a description is given of embodiments of the invention with the accompanying drawings.

Figure 6:
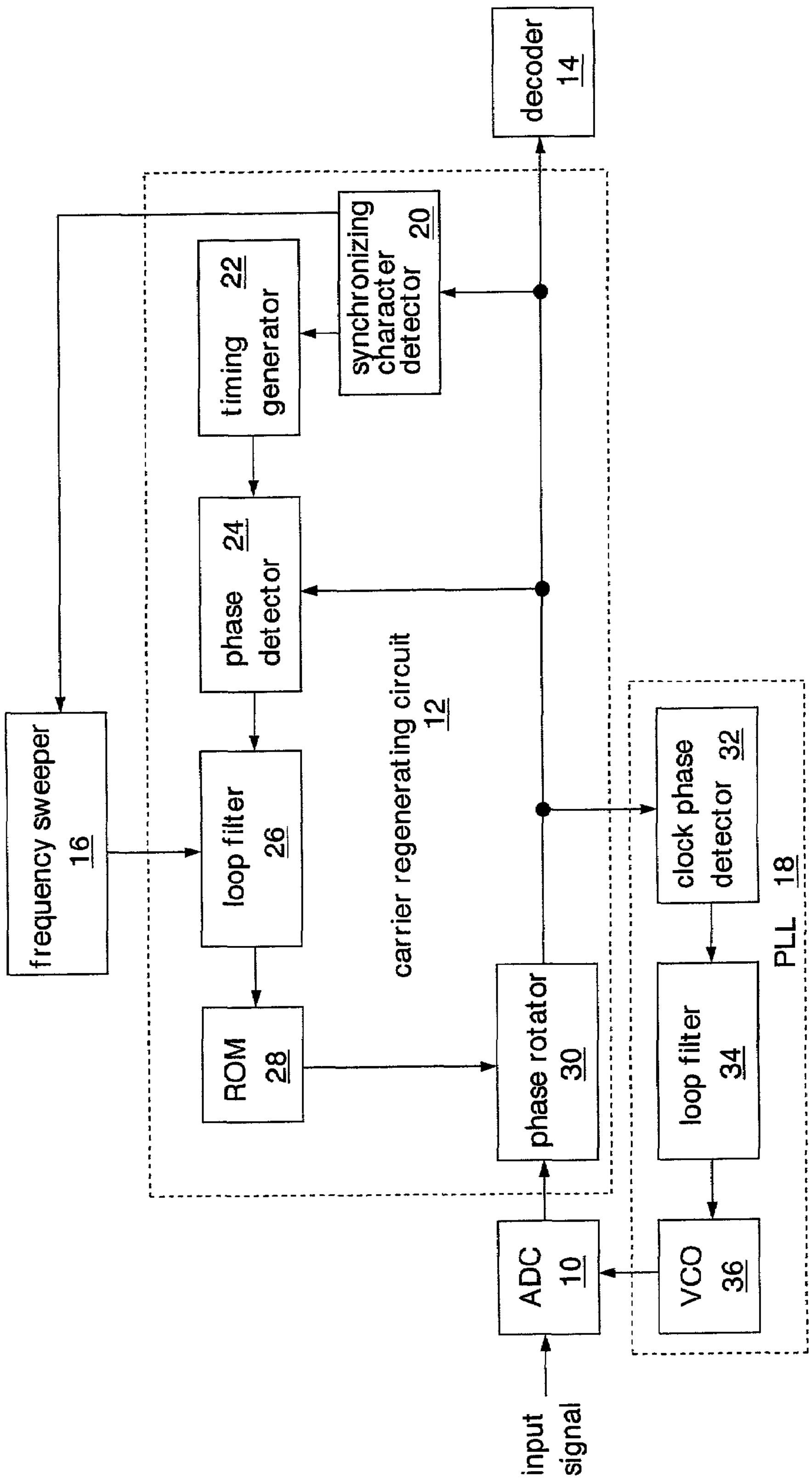
FIG. 6 is a block diagram showing the first embodiment according to the present invention.

FIG. 6 shows the first embodiment of a digital signal detector, a digital demodulator, and a method for detecting a digital signal, and a method for synchronous detection of the digital demodulator.

The digital demodulator has an AD converter (to be called hereinafter an "ADC") 10, a carrier regenerating circuit 12, a decoder 14, a frequency sweeper 16, and a PLL (Phase Locked Loop) 18. The digital demodulator is formed of one chip on a semiconductor substrate as a semiconductor integrated circuit. For example, it is mounted in a receiving terminal (tuner) of the ISDB-S digital broadcast, and carries out quasi-synchronous detection. The carrier regenerating circuit 12 has a synchronizing character detector 20 that is a digital signal detector to detect a synchronizing character, a timing generator 22, a phase detector 24, a loop filter 26, a ROM 28 and, a phase rotator 30. The PLL circuit 18 has a clock phase detector 32, a loop filter 34 and a voltage control oscillator (to be called hereinafter an "VCO") 36.

The ADC 10 quantizes an analog input signal (modulation signal) and converts it to a digital signal. The synchronizing character detector 20 detects a synchronizing character from the input signal converted to a digital signal. The timing generator 22 generates a signal showing a specified modulation technique to reduce a frequency after the synchronizing character is detected. The phase detector 24 detects a phase shift from the phase in which the input signal is to originally exist. The loop filter 26 receives information from the phase detector 24 and frequency sweeper 16, and generates a control signal to control the ROM 28 on the basis of this information. The ROM 28 stores compensation data that compensates the phase rotator 30. The ROM 28 decodes the output of the loop filter 26 and outputs a compensation signal to compensate the phase rotator 30. The phase rotator 30 rotates the phase of the input signal in accordance with the compensation signal in order to compensate a shift in the carrier frequency of the input signal. The frequency sweeper 16 adds or subtracts a predetermined value of frequency difference and outputs the calculation result to the loop filter 26. According to this calculation, it is possible to demodulate an input signal where a large carrier frequency shift undetectable by the carrier regenerating circuit 12 occurs.

The clock phase detector 32 in the PLL 18 detects a timing shift which leads to operating the ADC 10. The loop filter 34 generates a signal for controlling the VCO 36. The VCO 36 generates a conversion timing of the ADC 10. The detector 14 decodes the input signal after the synchronizing character is detected.

Figure 7:
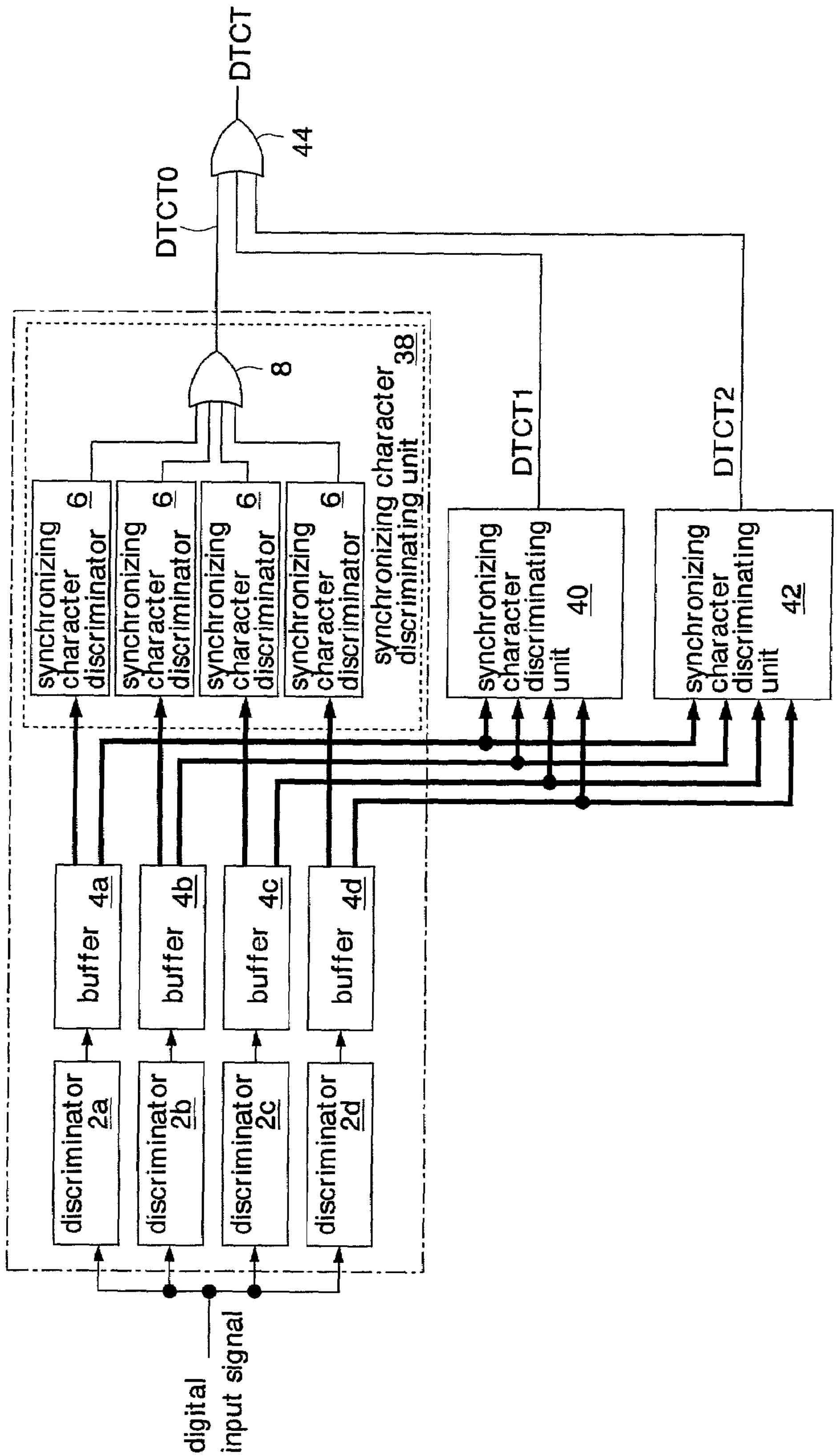
FIG. 7 is a block diagram showing the detail of a detector of FIG. 6.

FIG. 7 shows the details of the synchronizing character detector 20. In the drawing, the thick arrows indicate signal lines consisting of a plurality of wires.

Figure 3:
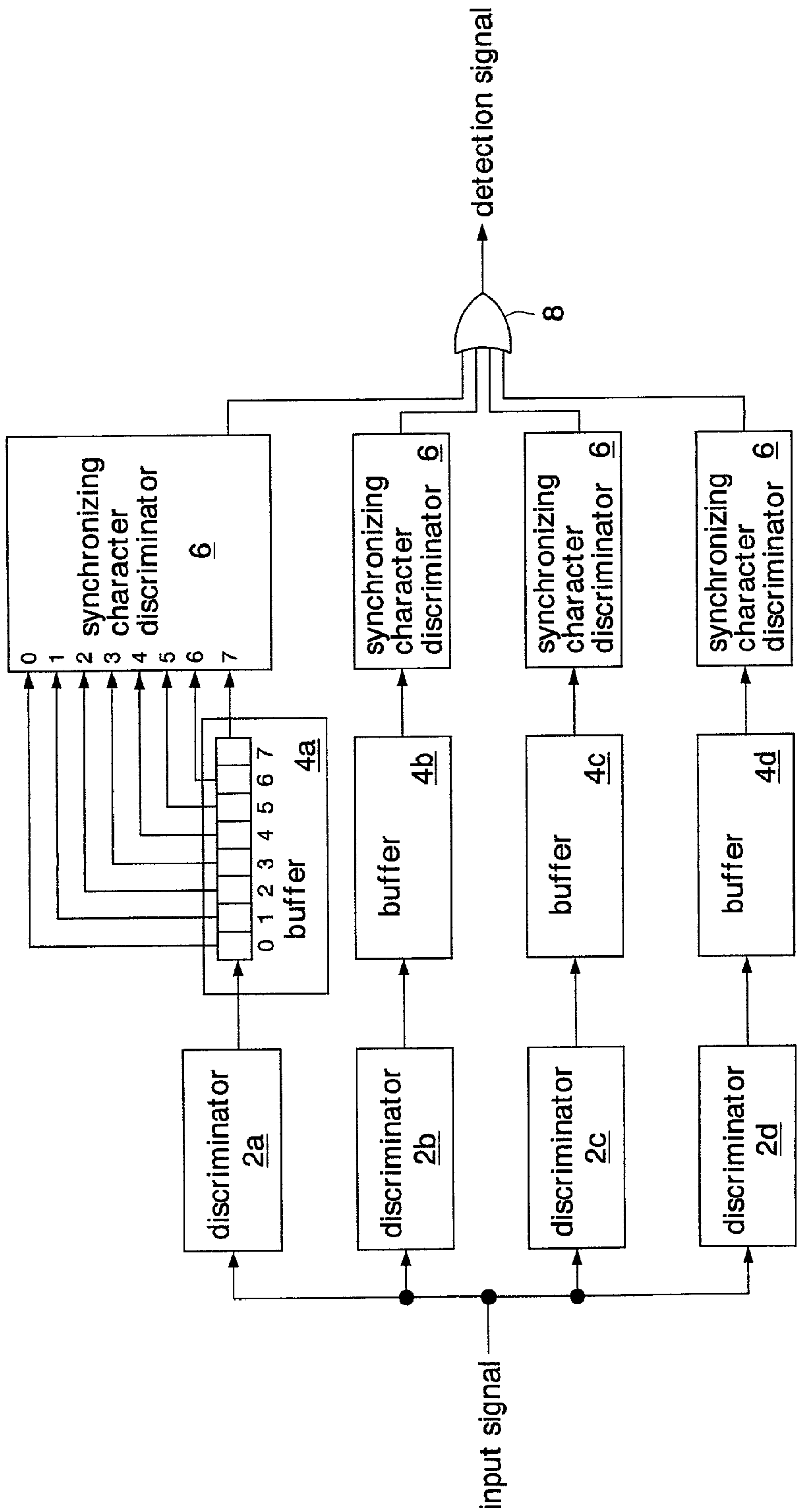
FIG. 3 is a block diagram showing a synchronizing character detector having four discriminators of the prior art.

The synchronizing character detector 20 has discriminators **2*a*, 2*b*, 2*c*, and 2*d* for receiving a digital input signal, buffers 4*a*, 4*b*, 4*c*, and 4*d*, synchronizing character discriminating units 38, 40 and 42, and an OR circuit 44. The discriminators 2*a*, 2*b*, 2*c* and 2*d* operate as conversion units for converting input signals to digital data according to respective predetermined discriminating conditions. The synchronizing character discriminating unit 38 has four synchronizing character discriminators 6 and an OR circuit 8. The OR circuit 8 outputs a detection signal DTCT0. The discriminators 2*a* through 2*d* and buffer 4*a* through 4*d*, synchronizing character 6 and OR circuit 8 are the same circuits as those in a prior art example. That is, the circuit surrounded by the dotted chain line in the drawing has an identical construction with FIG. 3. As described above, since a demodulator according to the embodiment utilizes a number of prior art circuits, the design efficiency can be further improved. In addition, circuits to be added are only synchronizing character discriminating units 40, 42 and an OR circuit 44**. Therefore, an increase in circuit scale can be minimized.

The synchronizing character discriminating unit 40 receives respective comparison data strings from each of the buffers 4*a* through 4*d*, and outputs a detection signal DTCT1. The synchronizing character discriminating unit 42 receives respective comparison data strings from each of the buffers 4*a* through 4*d*, and outputs a detection signal DTCT2.

Figure 8:
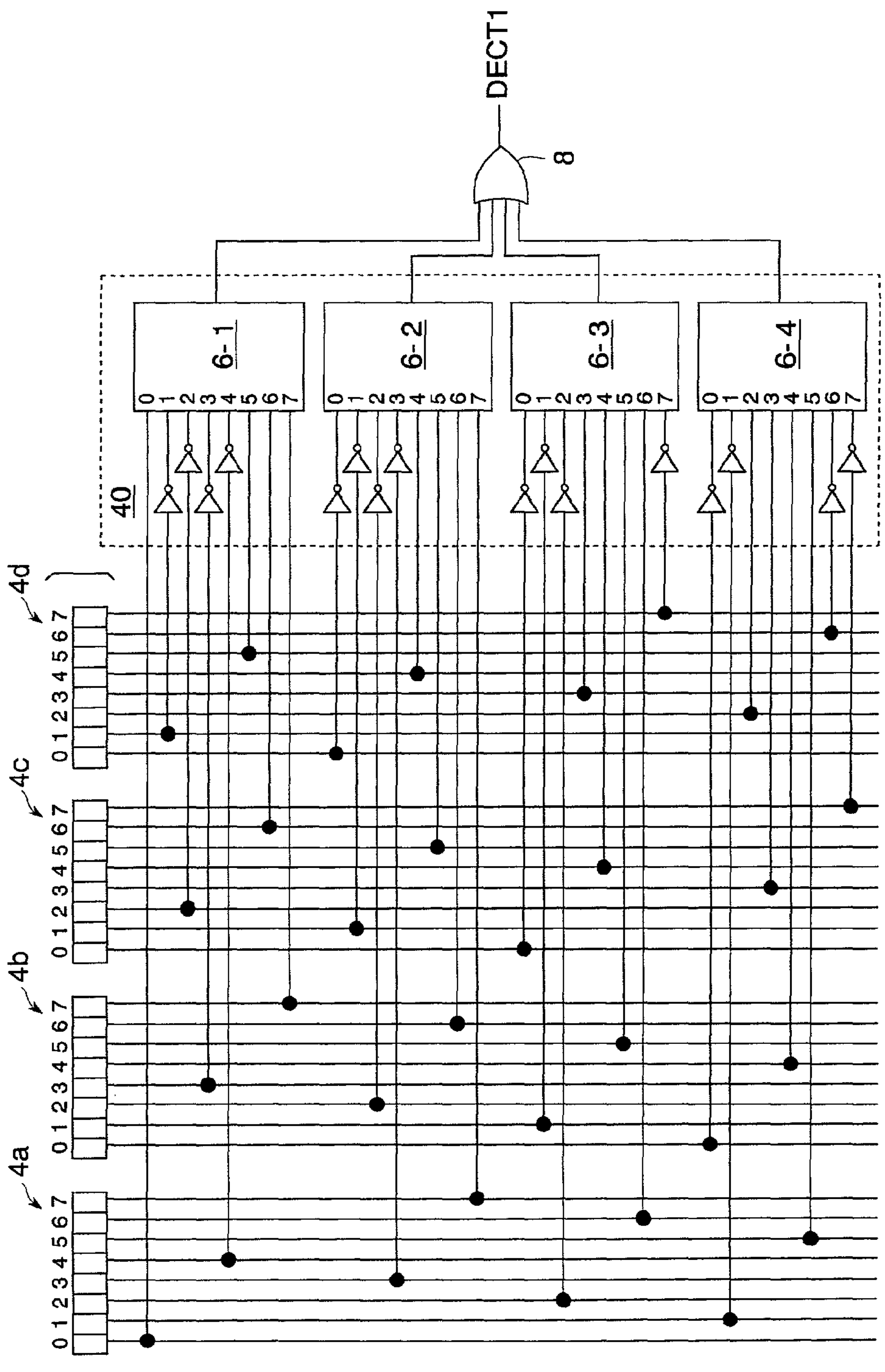
FIG. 8 is a block diagram showing the details of a synchronous character discriminating unit 40 of FIG. 7.
Figure 9:
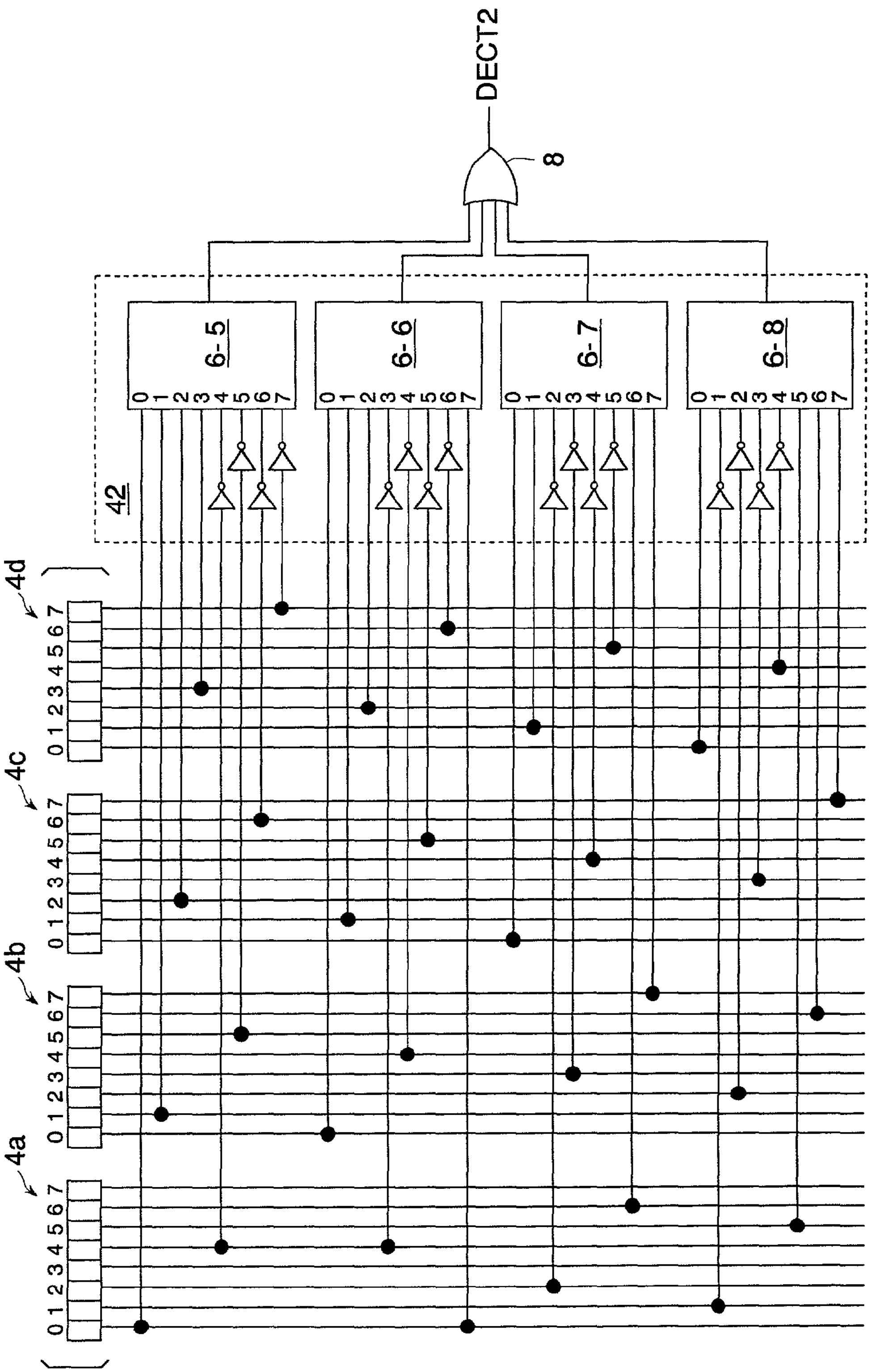
FIG. 9 is a block diagram showing the details of a synchronous character discriminating unit 42.

FIG. 8 and FIG. 9 show the details of the synchronizing character discriminating units 40 and 42.

The synchronizing character discriminating units 40 has synchronizing character discriminators 6-1, 6-2, 6-3, and 6-4, a plurality of inverters that invert signals to be supplied to these synchronizing character discriminators 6-1 through 6-4, and an OR circuit 8 that logically calculates output signals being the results of discrimination made by the synchronizing character discriminators 6-1 through 6-4. The synchronizing character discriminating units 42 has the synchronizing character discriminators 6-5, 6-6, 6-7, and 6-8, a plurality of inverters for inverting signals to be supplied to synchronizing character discriminators 6-5 through 6-8, and an OR circuit 8 that logically calculates the output signals being the result of discrimination made by the synchronizing character discriminators 6-5 through 6-8. The synchronizing character discriminators 6-1 through 6-8 receives data of a predetermined bit of the data stored in the buffers 4*a* through 4*d* and inverted data of a predetermined bit thereof at respective input terminals 0 through 7. The synchronizing character discriminators 6-1 through 6-8 are the same circuits as the synchronizing character discriminator 6 shown in FIG. 7. Herein, wiring including inverters from outputs of the buffers 4*a* through 4*d* to the synchronizing character discriminators 6-1 through 6-8 functions as a data composing unit that constitutes a comparison data string. The data composing unit constitutes a plurality of comparison data strings by combining predetermined data of the digital data so that the phase as a discriminating condition used for discriminating the predetermined data rotates in time series, which will be described later.

Figure 10:
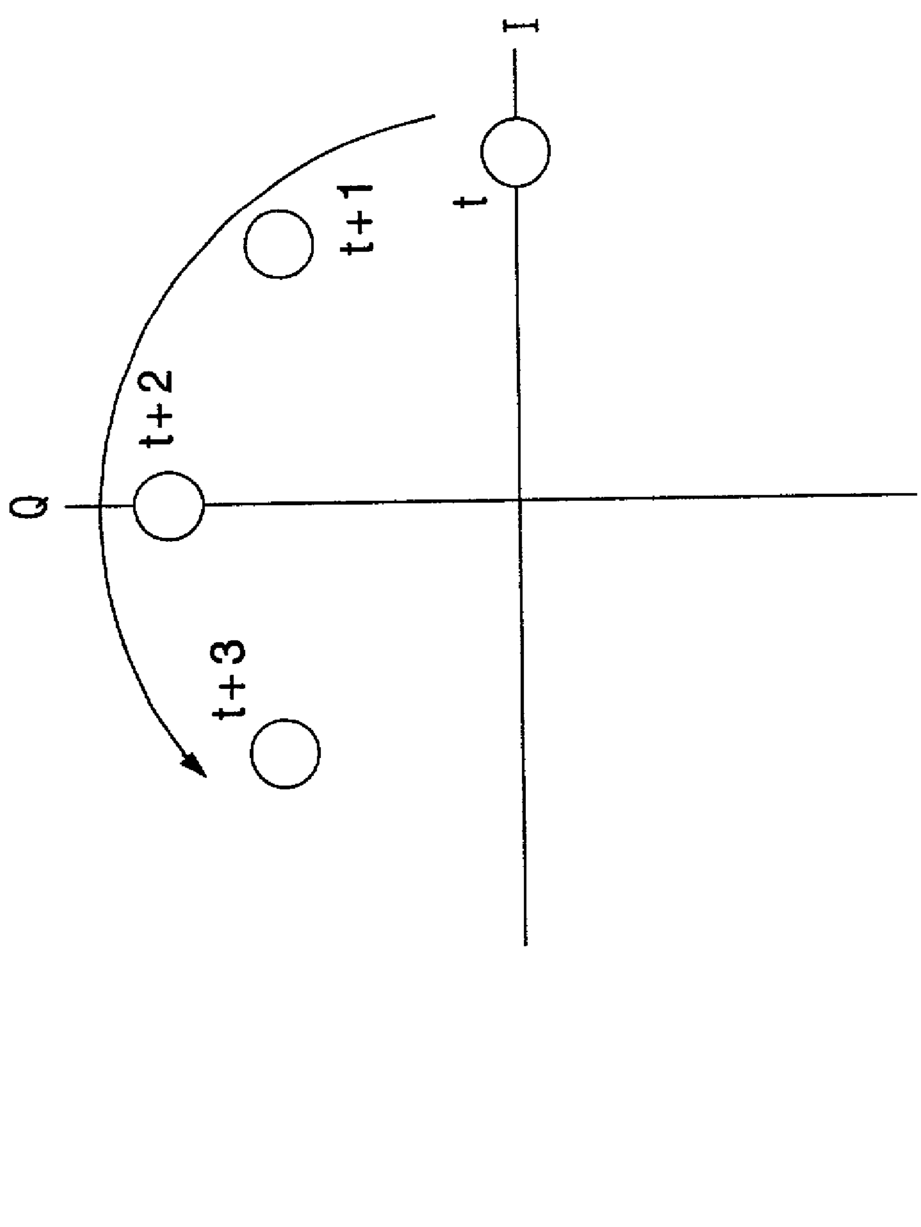
FIG. 10 is an explanatory view showing phase vectors of respective symbols of synchronous characters where it is provided with the frequency shift.

FIG. 10 shows a phase vector of respective symbols of a synchronizing character in a case where the carrier wave frequency of the synchronizing character largely shifts from the operating frequency of the carrier regenerating circuit 12.

The phase of a symbol being at the right side of the axis I at a certain point in time t rotates by 45° counterclockwise at the next point in time t+1 in the drawing. Further, the phase of the symbol shifts upward on the axis Q at the next point in time t+2, and rotates by 45° counterclockwise from the point in time t+2 at the next time t+3 in the drawing. This indicates that the frequency of the carrier wave shifts by F/8 when the modulating speed is F[baud]. In the case of having such large frequency shift and noise field intensity, it is impossible to detect any synchronizing character in the prior art.

FIG. 11 and FIG. 12 show the outline of the operation of the synchronizing character discriminating units 40 and 42.

Figure 1:
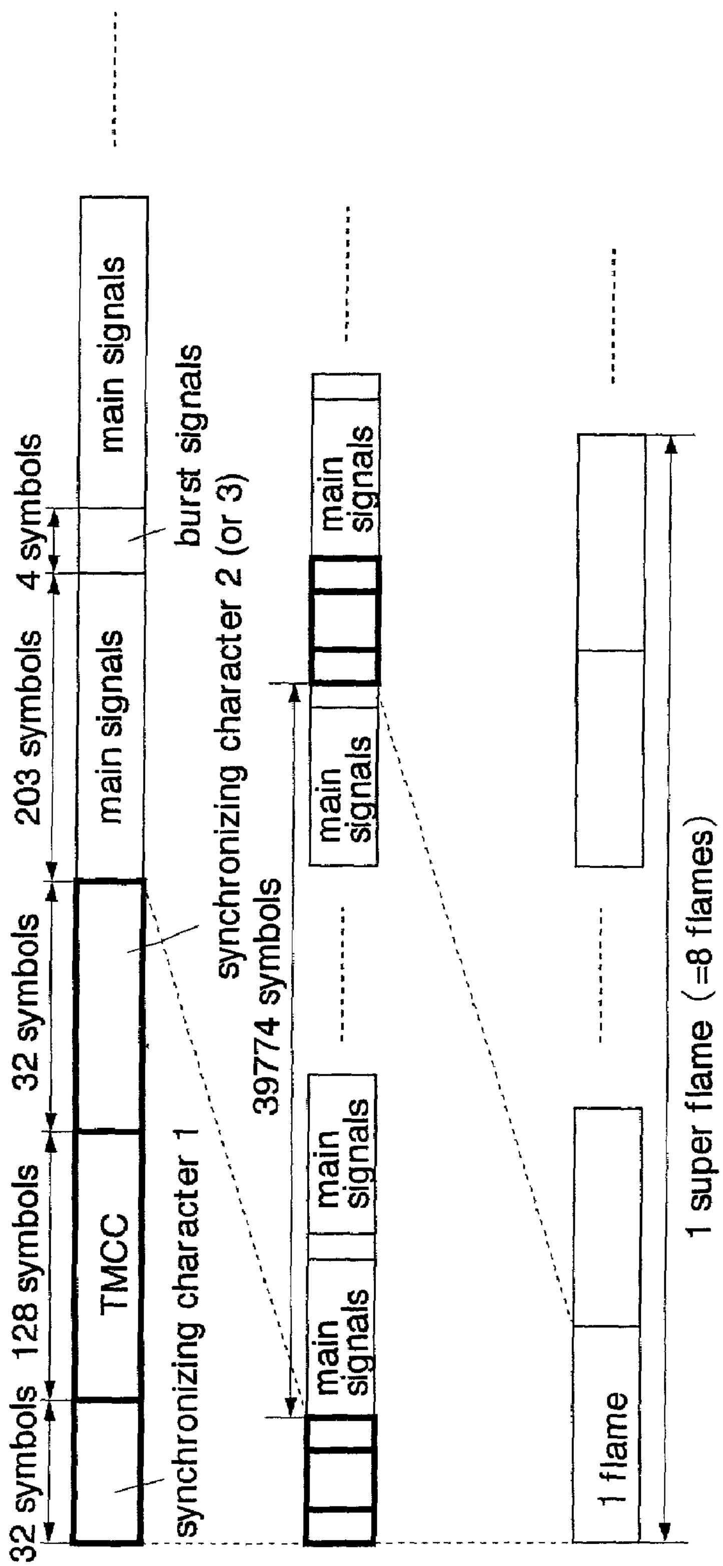
FIG. 1 is an explanatory view of the prior art, which shows the outline of a transmission signal in a prior art ISDB-S.
Figure 2:
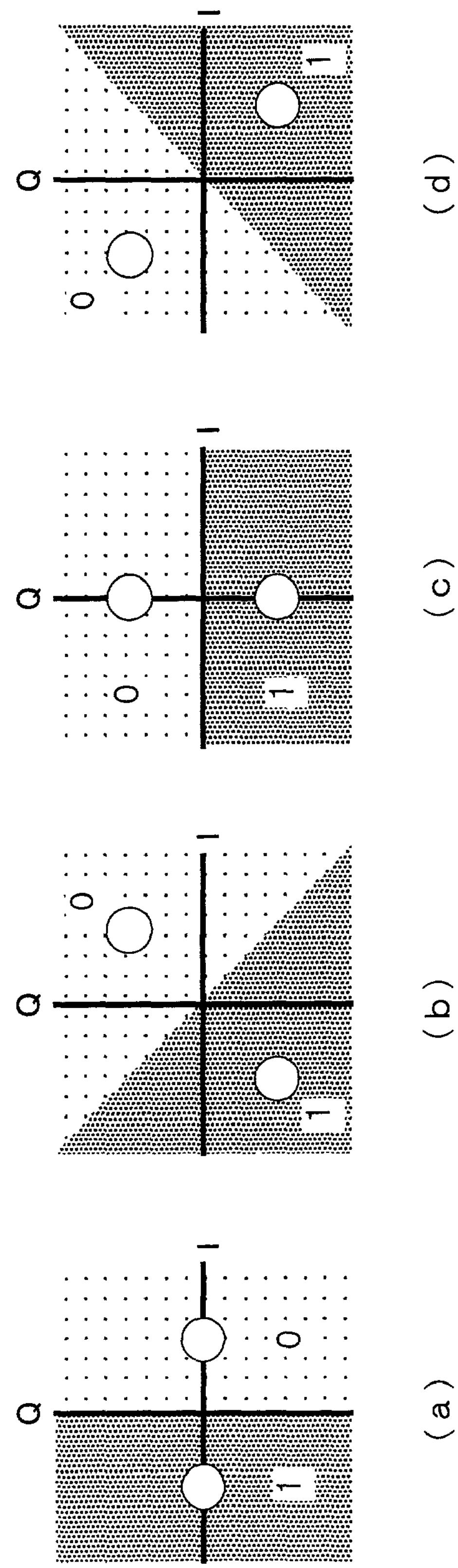
FIG. 2 is an explanatory view of the prior art showing various phase vectors of synchronous characters modulated by the BPSK.

In the drawings, square patterns and figures shown at the right side of the patterns indicate the contents of data to be received by respective input terminals 0 through 7 of the synchronizing character discriminators. The square patterns correspond to the phase vectors shown in FIG. 2. That is, meshed areas correspond to areas "1", and white areas correspond to areas "0". The figures (for example, 2*a*(0), etc.,) at the right side of the square patterns indicate that the respective input terminals 0 through 7 of the synchronizing character discriminator receive which bit data of which buffer. A symbol "/" in front of the figures indicates that the data are inverted by inverters shown in FIG. 8 and FIG. 9.

For example, in FIG. 11, the input terminal 0 of the synchronizing character discriminator 6-1 receives data stored in bit 0 of the buffer 4*a*. The data is discriminated on the basis of the patterns shown in the drawings. As well, the input terminal 1 of the synchronizing character discriminator 6-1 receives inverted data of the data stored in bit 1 of the buffer 4*d*. In other words, the synchronizing character discriminating units 40 and 42 receive the discrimination results from the discriminators 2*a* through 2*d* stored in predetermined buffers 4*a* through 4*d* in the order of time series, and can detect synchronizing characters by comparing the received data strings with the expected data strings.

As has been made apparent from the patterns shown in FIG. 11, even in a case where the phase of the carrier waves shifts in increments of 45° with respect to the phase of a clock of the carrier regenerating circuit 12 (FIG. 10), a synchronizing character can be detected by any one of the synchronizing character discriminators 6-1 through 6-4. Similarly, as has been made apparent from the square patterns shown in FIG. 12, even in a case where the phase of a carrier wave shifts in increments of −45° with respect to the phase of a clock of the carrier regenerating circuit 12, a synchronizing character can be detected by any one of the synchronizing character discriminators 6-5 through 6-8.

Figure 13:
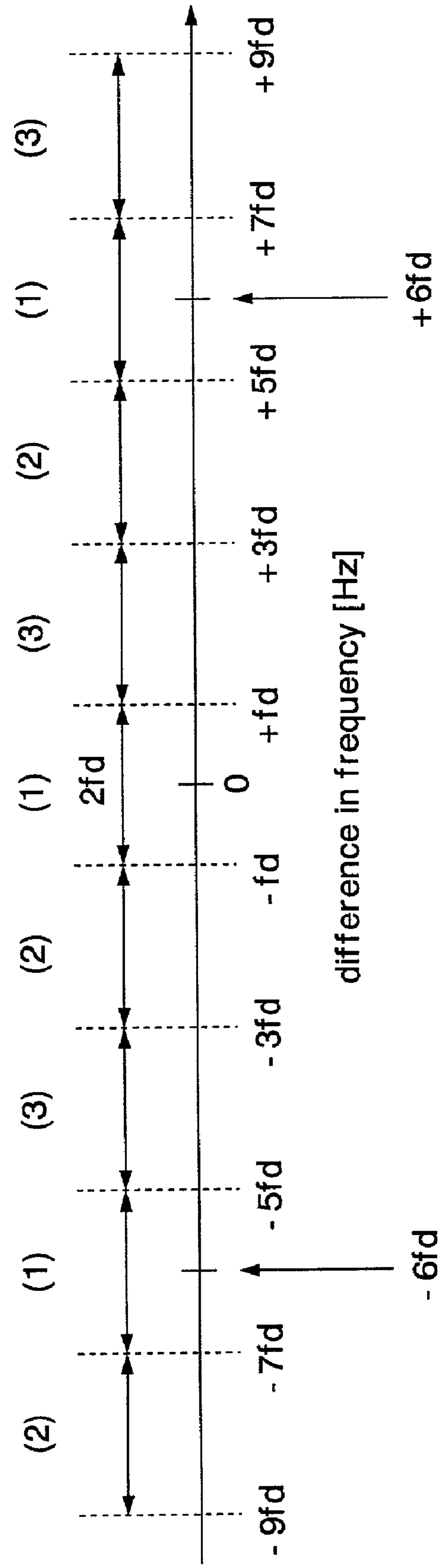
FIG. 13 is an explanatory view showing an example of synchronous detection.

FIG. 13 shows an example of detecting synchronizing characters in the embodiment. In the example, assumed that 6 fd=F/8, it is possible to detect a synchronizing character having a frequency difference up to ±9 fd as in FIG. 4.

Figure 4:
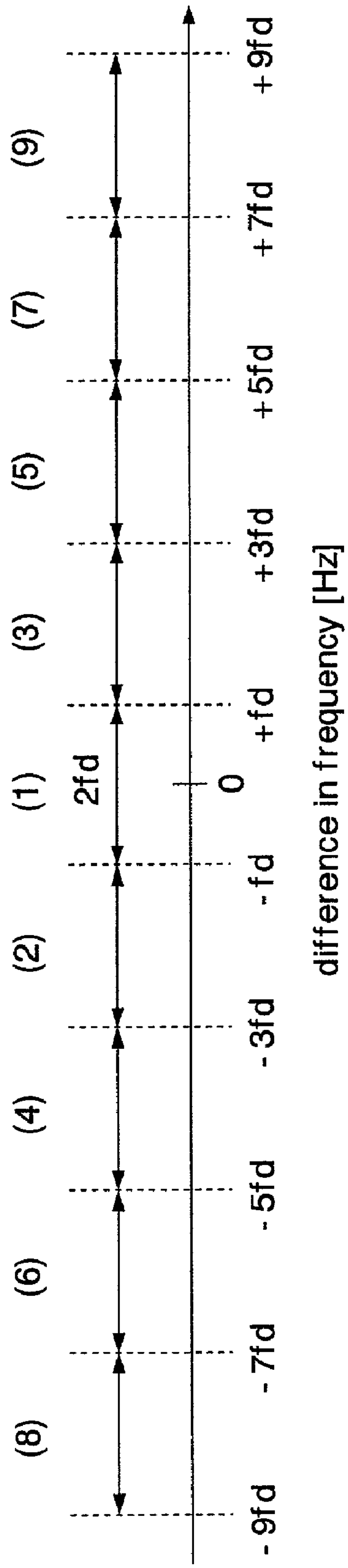
FIG. 4 is an explanatory view showing a prior art example of detection by synchronous characters.
Figure 5:
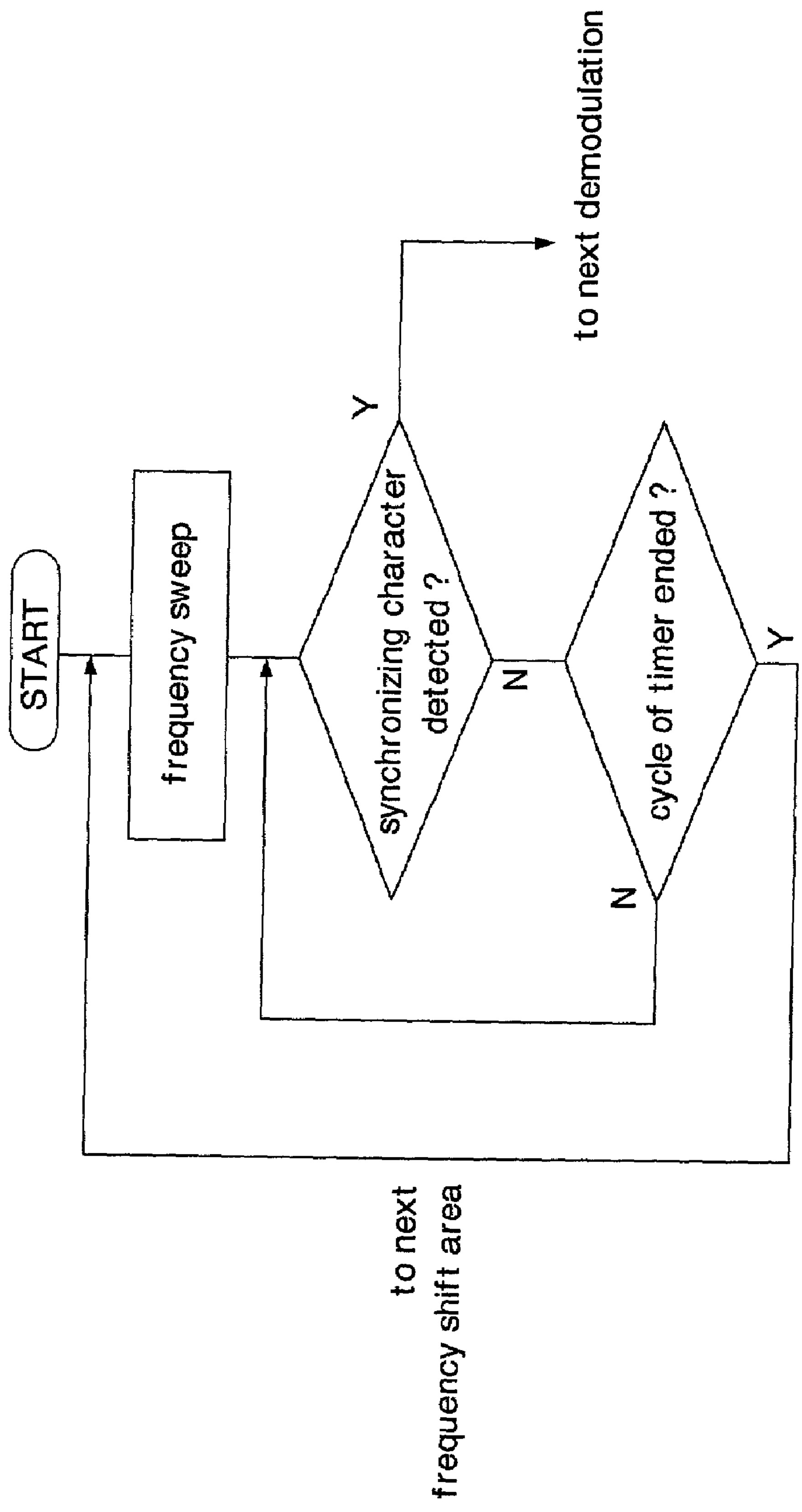
FIG. 5 is a flow chart showing actions of synchronous detection in a demodulator having a prior art frequency sweeper.

The synchronizing character detector 20 shown in FIG. 7 can detect a synchronizing character with a frequency difference 0 by the synchronizing character discriminating unit 38, a synchronizing character with a frequency difference +F/8 by the synchronizing character discriminating unit 40, and a synchronizing character with a frequency difference −F/8 by the synchronizing character discriminating unit 42 (FIG. 7(1)). That is, it is possible to concurrently detect synchronizing characters with frequency differences from each other at three points. Therefore, for example, by sweeping frequencies three times in the order of FIGS. 7(1), (2) and (3), a synchronizing character with a frequency difference up to ±9 fd, which is the same as in the conventional, can be detected (FIG. 4). In other words, synchronous detection can be performed in a short time.

As described above, in the embodiment, each synchronizing character with a frequency difference can be simultaneously detected by a plurality of synchronizing character discriminating units 38, 40, and 42. Therefore, it is possible to drastically reduce the number of times frequencies are swept and detect synchronizing characters in a short time.

Since the discriminators 2*a* through 2*d* and buffers 4*a* through 4*d* can be commonly used in the synchronizing character discriminating units 38, 40, and 42, the circuit of the synchronizing character detector 20 can not be substantially increased in scale in comparison with that of the prior art. As a result, a high performance demodulator can be formed without increasing production costs.

Utilizing the discriminators 2*a* through 2*d* and buffers 4*a* through 4*d* having the same construction as that of the prior art enables the design efficiency of the detector and demodulator to be improved.

Figure 14:
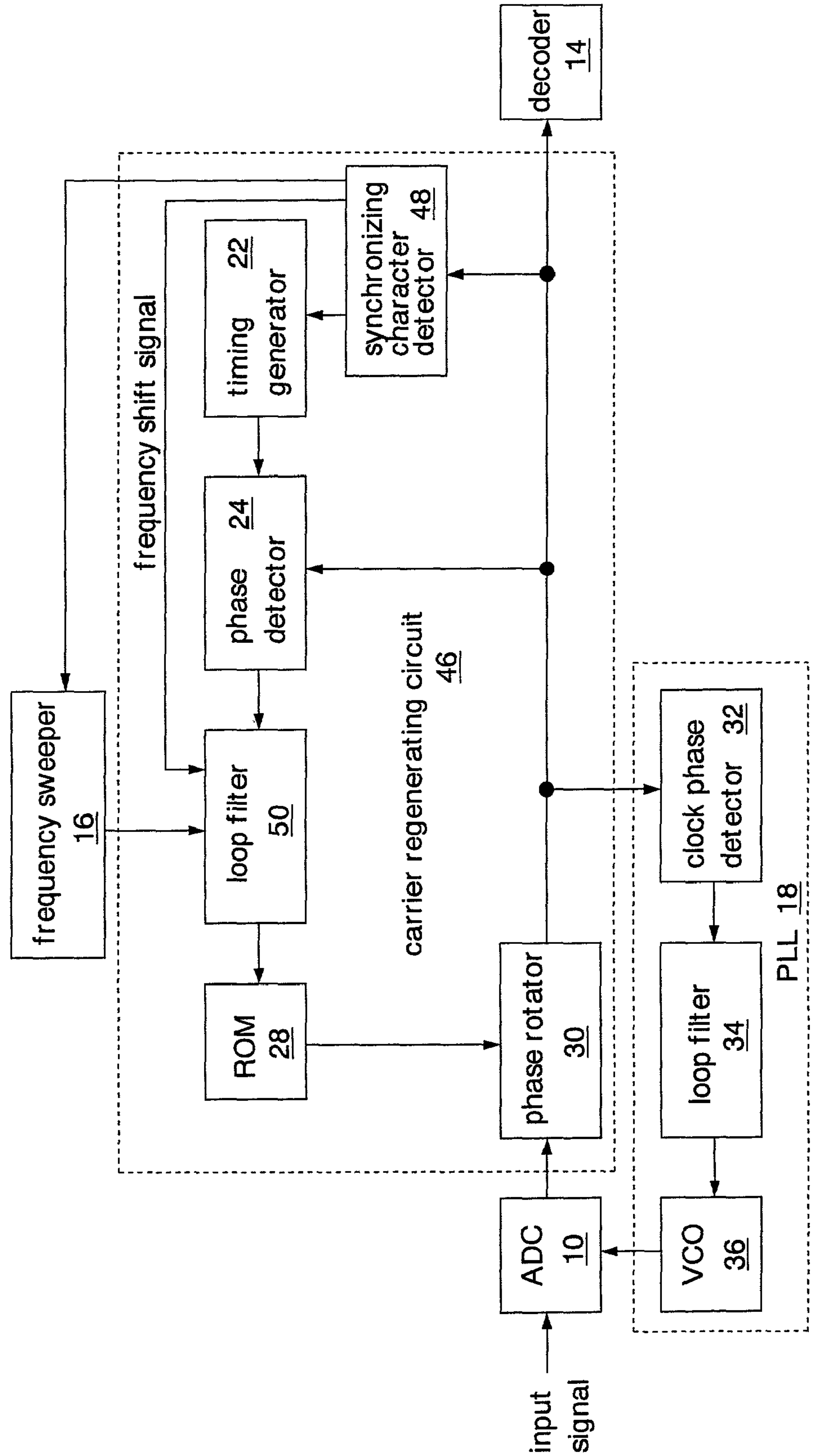
FIG. 14 is a block diagram showing the second embodiment according to the present invention.

FIG. 14 shows a second embodiment of a digital signal detector and digital demodulator according to the present invention. Circuits and signals that are identical to those of the first embodiment are given the same reference numbers, and detailed description thereof is omitted.

In the second embodiment, a synchronizing character detector 48 and loop filter 50 of the carrier regenerating circuit 46 differ from those of the first embodiment. The other construction is the same as that of the first embodiment. A feature of the embodiment is that the synchronizing character detector 48 outputs a frequency shift signal. The frequency shift signal is supplied to a loop filter 50.

Figure 15:
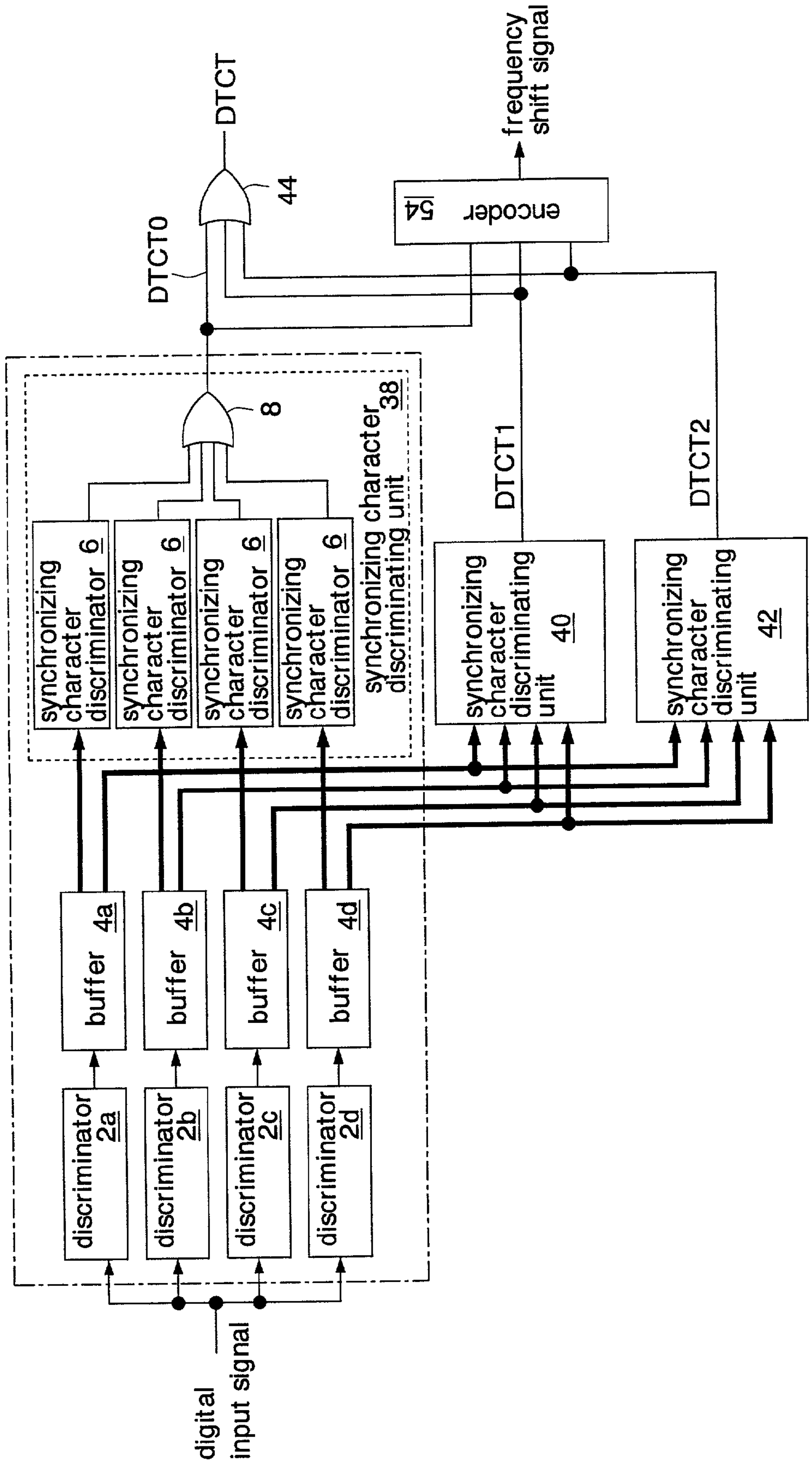
FIG. 15 is a block view showing the details of a detector according to FIG. 14.

FIG. 15 shows the detail of the synchronizing character detector 48. The synchronizing character detector 48 same as in the first embodiment functions as a digital signal detector, which detects a synchronizing character.

The synchronizing character detector 48 is constructed by adding an encoder 54 to the synchronizing character detector 20 of FIG. 7. The encoder 54 receives detection signals DTCT0, DTCT1, and DTCT2 from the synchronizing character discriminating units 38, 40 and 42, and outputs frequency shift signals corresponding to these detection signals. That is, the encoder 54 functions as a frequency difference detector that detect a frequency difference between the carrier frequency of a modulation signal and a reference signal of the carrier regenerating circuit.

In the embodiment, for example, the synchronizing character detector 48 outputs a frequency shift signal having information of "a+45° shift" when it receives a discrimination signal DTCT1 from the synchronizing character discriminating unit 40. In the case of detecting a synchronizing character having a length of some degree, that is, a synchronizing character with a practical length, the frequency shift compensated by the carrier regenerating circuit 46 becomes larger than the frequency shift (180° in the example of FIG. 2) that can be discriminated by the discriminator 2*a* (or 2*b* through 2*d*). In such a case, the loop filter 50 shown in FIG. 14 directly receives a frequency shift signal and controls the phase rotator 30, whereby a time required for regeneration of a carrier wave can be shortened.

In the embodiment, effects similar to those of the first embodiment described above can be attained. Further, in the embodiment, the synchronizing character detector 48 generates frequency shift signals corresponding to the detection signals DTCT0, DTCT1, and DTCT2, and feeds the signals back to the loop filter 50. Therefore, a time required for regeneration of a carrier wave can be shortened. Resultantly, performance of the modulator can be improved.

In addition, in the embodiments, a description has been given of the example in which a synchronizing character is detected by using the discriminators 2*a* through 2*d* whose discriminating conditions differs at a step of 45°. However, the invention is not limited to such embodiments. For example, a synchronizing character may be detected by discriminators whose respective discriminating conditions are set by differentiating the phase in increments of 30° or 15°. By setting the discriminating conditions of the discriminators with a smaller phase difference, synchronizing characters with many frequency differences as possible can be detected. As a result, the number of times of sweeping can be reduced, and the time required to detect a synchronizing character can be shortened. When a length of the time required to detect a synchronizing character is set constant, it is able to detect synchronizing characters with wider frequency differences. Moreover, noise durability can be improved.

In the embodiments described above, a description has been given of the example in which the present invention is applied to a detector that detects synchronizing characters modulated by the BPSK. The present invention is not limited to such embodiments. For example, the present invention may be applicable to a detector that detects synchronizing characters modulated by QPSK and 8PSK that have more signals than in the BPSK.

In the embodiments described above, a description has been given of the example in which the invention is applied to a demodulator that carries out quasi-synchronous detection. The present invention is not limited to such embodiments. For example, the invention may be applicable to a demodulator that carries out synchronous detection.

The invention is not limited to the above embodiments and various modifications may be made without departing from the spirit and the scope of the invention. Any improvement may be made in part or all of the components.

What is claimed is:

1. A digital signal detector for detecting predetermined data strings in modulation signals, comprising:

- a plurality of conversion units for receiving quantized modulation signals and converting the received signals to a plurality of digital data according to a plurality of discriminating conditions which are set by shifting phases, the phases being boundaries of discrimination;
- a plurality of buffers retaining digital data that are sequentially output from said conversion units;
- a data composing unit for constituting a plurality of comparison data strings by combining in time-series said plurality of digital data retained in said buffers so that phases rotate, the phases being used for discriminating said digital data combined in time-series in each of the comparison data strings; and
- a plurality of discriminating units comparing said comparison data strings with respective expected data strings.

2. The digital signal detector according to claim 1, further comprising a frequency difference detector for detecting a difference between a carrier frequency of said modulation signal and a frequency of a reference signal in response to the coincidence of said comparison data string in any one of said discriminating units with said expected data string.

3. A digital demodulator comprising a digital signal detector for detecting a predetermined data string in modulation signals and for performing synchronous detection of the received modulation signals, wherein said digital signal detector comprises:

- a plurality of conversion units for receiving quantized modulation signals and converting the received signals to a plurality of digital data according to a plurality of discriminating conditions which are set by shifting phases, the phases being boundaries of discrimination;
- a plurality of buffers retaining digital data that are sequentially output from said conversion units;
- a data composing unit constituting a plurality of comparison data strings by combining in time-series said plurality of digital data retained in said buffers so that phases rotate, the phases being used for discriminating said digital data combined in time-series in each of the comparison data strings; and
- a plurality of discriminating units for comparing said comparison data strings with respective expected data strings.

4. The digital demodulator according to claim 3, further comprising a frequency difference detector detecting a difference between a carrier frequency of said modulation signal and a frequency of a reference signal in response to the coincidence of said comparison data string in any one of said discriminating units with said expected data string.

5. A method for detecting a predetermined data string in modulation signals, comprising the steps of:

receiving quantized modulation signals and converting the received signals to a plurality of digital data according to a plurality of discriminating conditions which are set by shifting phases, the phases being boundaries of discrimination;

retaining in buffers digital data that are sequentially output from said conversion units;

constituting a plurality of comparison data strings by combining in time-series said plurality of digital data retained in said buffers so that phases rotate, the phases being used for discriminating said digital data combined in time-series in each of the comparison data strings;

comparing said comparison data strings with respective expected data strings; and detecting said predetermined data strings when any one of said comparison strings coincides with said expected data strings.

6. A method for synchronous detection of a digital demodulator for detecting a predetermined data string in modulation signals, comprising the steps of:

receiving quantized modulation signals and converting the received signals to a plurality of digital data according to a plurality of discriminating conditions which are set by shifting phases, the phases being boundaries of discrimination;

retaining in buffers digital data that are sequentially output from said conversion units;

constituting a plurality of comparison data strings by combining in time-series said plurality of digital data retained in said buffers so that phases rotate, the phases being used for discriminating said digital data combined in time-series in each of the comparison data strings;

comparing said comparison data strings with respective expected data strings; and performing synchronous detection by detecting said predetermined data strings when any one of said comparison strings coincides with said expected data strings.

7. The digital signal detector according to claim 1, wherein said predetermined data strings are detected when said comparison data strings coincide with said expected data strings.

8. The digital signal detector according to claim 3, wherein said predetermined data strings are detected when said comparison data strings coincide with said expected data strings.

* * * * *